United States Patent
Shabbir et al.

(10) Patent No.: US 10,353,357 B2
(45) Date of Patent: Jul. 16, 2019

(54) SYSTEMS AND METHODS FOR COMBINED ACTIVE AND PASSIVE COOLING OF AN INFORMATION HANDLING RESOURCE

(71) Applicant: Dell Products L.P., Round Rock, TX (US)

(72) Inventors: Hasnain Shabbir, Round Rock, TX (US); Dominick A. Lovicott, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 388 days.

(21) Appl. No.: 14/747,801

(22) Filed: Jun. 23, 2015

(65) Prior Publication Data

US 2016/0377083 A1  Dec. 29, 2016

(51) Int. Cl.
    G05B 15/02 (2006.01)
    F04D 27/00 (2006.01)
    G06F 1/20 (2006.01)

(52) U.S. Cl.
    CPC ........... *G05B 15/02* (2013.01); *F04D 27/004* (2013.01); *G06F 1/20* (2013.01)

(58) Field of Classification Search
    CPC ............................. G05B 15/02; F04D 27/004
    See application file for complete search history.

(56) References Cited

U.S. PATENT DOCUMENTS

| | | | | |
|---|---|---|---|---|
| 7,552,364 B2 * | 6/2009 | Johnson | ..................... | G06F 1/26 714/47.2 |
| 8,374,716 B1 * | 2/2013 | Frankel | ................... | G05B 15/02 700/170 |
| 9,261,930 B2 * | 2/2016 | Moore | ..................... | G06F 1/206 |
| 9,329,586 B2 * | 5/2016 | Artman | ................... | G05B 15/02 |
| 2003/0097875 A1 * | 5/2003 | Lentz | .................... | G01F 1/6845 73/204.26 |
| 2005/0216221 A1 * | 9/2005 | Broyles, III | ............. | G01K 1/08 702/132 |
| 2005/0241810 A1 * | 11/2005 | Malone | .............. | H05K 7/20727 165/122 |
| 2005/0244263 A1 * | 11/2005 | Hardt | .................... | F04D 27/004 415/47 |

(Continued)

*Primary Examiner* — Mohammad Ali
*Assistant Examiner* — Kelvin Booker
(74) *Attorney, Agent, or Firm* — Jackson Walker L.L.P.

(57) ABSTRACT

In accordance with embodiments of the present disclosure, an information handling system may include a processor and an air mover control system for controlling at least one air mover configured to drive airflow to one or more components of the information handling system. The air mover control system may be configured to read from an information handling resource of the information handling system, wherein the information handling resource comprises an active cooling system, a fault condition cooling requirement defining a minimum airflow required by the information handling resource from the at least one air mover in presence of a fault condition of the active cooling system. The air mover control system may also be configured to read from the information handling resource a variable indicating whether the fault condition of the active cooling system exists. The air mover control system may also be configured to, responsive to the variable indicating the fault condition exists, determine a speed for the at least one air mover to satisfy the fault condition cooling requirement and cause the at least one air mover to operate at the speed.

13 Claims, 2 Drawing Sheets

(56) References Cited

U.S. PATENT DOCUMENTS

| | | | |
|---|---|---|---|
| 2006/0122740 A1* | 6/2006 | Law | G06F 1/206 700/300 |
| 2006/0129881 A1* | 6/2006 | Furuichi | G06F 1/206 714/11 |
| 2006/0168975 A1* | 8/2006 | Malone | F24F 11/001 62/180 |
| 2012/0292007 A1* | 11/2012 | Chiu | F28D 15/0275 165/247 |
| 2012/0303164 A1* | 11/2012 | Smith | H05K 7/20745 700/276 |
| 2013/0107905 A1* | 5/2013 | Campbell | G01F 25/0007 374/1 |
| 2014/0014292 A1* | 1/2014 | Rice | H05K 7/20745 165/11.1 |
| 2014/0025208 A1* | 1/2014 | Allen-Ware | G05D 23/1934 700/276 |
| 2014/0218860 A1* | 8/2014 | Yu | G06F 1/203 361/679.48 |
| 2014/0244051 A1* | 8/2014 | Rollins | F04D 27/004 700/282 |
| 2014/0277750 A1* | 9/2014 | Artman | G05B 15/02 700/275 |
| 2014/0277784 A1* | 9/2014 | Mick | G05D 23/1917 700/286 |
| 2015/0005949 A1* | 1/2015 | Haridass | G06F 1/206 700/275 |
| 2015/0184883 A1* | 7/2015 | Hamann | H05K 7/20836 700/277 |
| 2015/0192936 A1* | 7/2015 | Kelly | H05K 7/1498 700/300 |
| 2015/0330397 A1* | 11/2015 | Alshinnawi | F04D 27/001 700/282 |
| 2015/0355651 A1* | 12/2015 | Balakrishnan | G05B 15/02 700/299 |
| 2016/0120070 A1* | 4/2016 | Myrah | H05K 7/20836 700/275 |
| 2016/0183406 A1* | 6/2016 | Ragupathi | H05K 7/20209 700/282 |

* cited by examiner

SYSTEMS AND METHODS FOR COMBINED ACTIVE AND PASSIVE COOLING OF AN INFORMATION HANDLING RESOURCE

TECHNICAL FIELD

The present disclosure relates in general to information handling systems, and more particularly to a combined passive and active cooling of an information handling resource.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM) and other components in information handling systems have increased in clock speed and power consumption, the amount of heat produced by such components as a side-effect of normal operation has also increased. Often, the temperatures of these components need to be kept within a reasonable range to prevent overheating, instability, malfunction and damage leading to a shortened component lifespan. Accordingly, air movers (e.g., cooling fans and blowers) have often been used in information handling systems to cool information handling systems and their components.

To control temperature of components of an information handling system, an air mover may direct air over one or more heatsinks thermally coupled to individual components. Device manufacturers are increasingly producing peripheral components in information handling systems that include an "active" cooling system comprising an air mover (e.g., fan) and heat sink local to (e.g., mounted or mechanically attached to) the peripheral component for cooling the peripheral component by driving air over the heat sink to cool the peripheral component, or a "passive" cooling system (e.g., another heat sink) that serves to reject heat of the peripheral component to air driven by one or more system-level air movers for cooling multiple components of an information handling system in addition to the peripheral component.

However, existing architectures provide inadequate dual-mode control of the active and passive cooling components. For instance, many thermal control systems lack an ability to detect the existence of a failure of the active cooling system air mover and react to such failure in order to provide adequate cooling from system-level air movers.

SUMMARY

In accordance with the teachings of the present disclosure, the disadvantages and problems associated with thermal control of dual-mode information handling resources may be substantially reduced or eliminated.

In accordance with embodiments of the present disclosure, an information handling system may include a processor and an air mover control system for controlling at least one air mover configured to drive airflow to one or more components of the information handling system. The air mover control system may be configured to read from an information handling resource of the information handling system, wherein the information handling resource comprises an active cooling system, a fault condition cooling requirement defining a minimum airflow required by the information handling resource from the at least one air mover in presence of a fault condition of the active cooling system. The air mover control system may also be configured to read from the information handling resource a variable indicating whether the fault condition of the active cooling system exists. The air mover control system may also be configured to, responsive to the variable indicating the fault condition exists, determine a speed for the at least one air mover to satisfy the fault condition cooling requirement and cause the at least one air mover to operate at the speed.

In accordance with these and other embodiments of the present disclosure, a method may include receiving a fault condition cooling requirement defining a minimum airflow required by an information handling resource, in presence of a fault condition of an active cooling system integral to the information handling resource, from at least one air mover configured to drive airflow to one or more components of an information handling system housing the information handling resource. The method may also include receiving a variable indicating whether the fault condition of the active cooling system exists. The method may further include responsive to the variable indicating the fault condition exists, determining a speed for the at least one air mover to satisfy the fault condition cooling requirement and cause the at least one air mover to operate at the speed.

In accordance with these and other embodiments of the present disclosure, an article of manufacture may include a non-transitory computer-readable medium and computer-executable instructions carried on the computer-readable medium. The instructions may be readable by a processor, the instructions, when read and executed, for causing the processor to: (i) receive a fault condition cooling requirement defining a minimum airflow required by an information handling resource, in presence of a fault condition of an active cooling system integral to the information handling resource, from at least one air mover configured to drive airflow to one or more components of an information handling system housing the information handling resource; (ii) receive a variable indicating whether the fault condition of the active cooling system exists; and (iii) responsive to the variable indicating the fault condition exists, determine a speed for the at least one air mover to satisfy the fault condition cooling requirement and cause the at least one air mover to operate at the speed.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
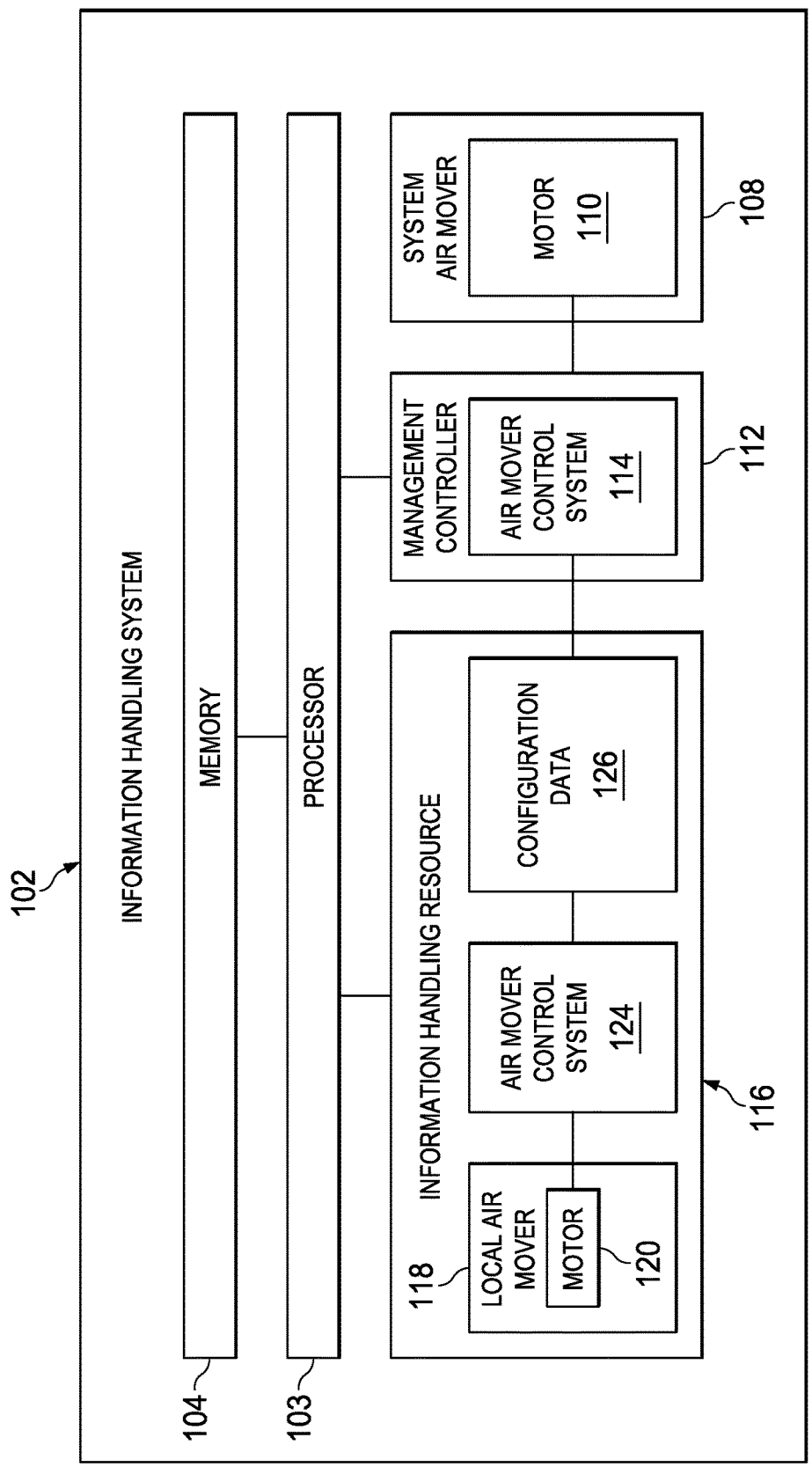
FIG. 1 illustrates a block diagram of an example information handling system, in accordance with the present disclosure.
Figure 2:
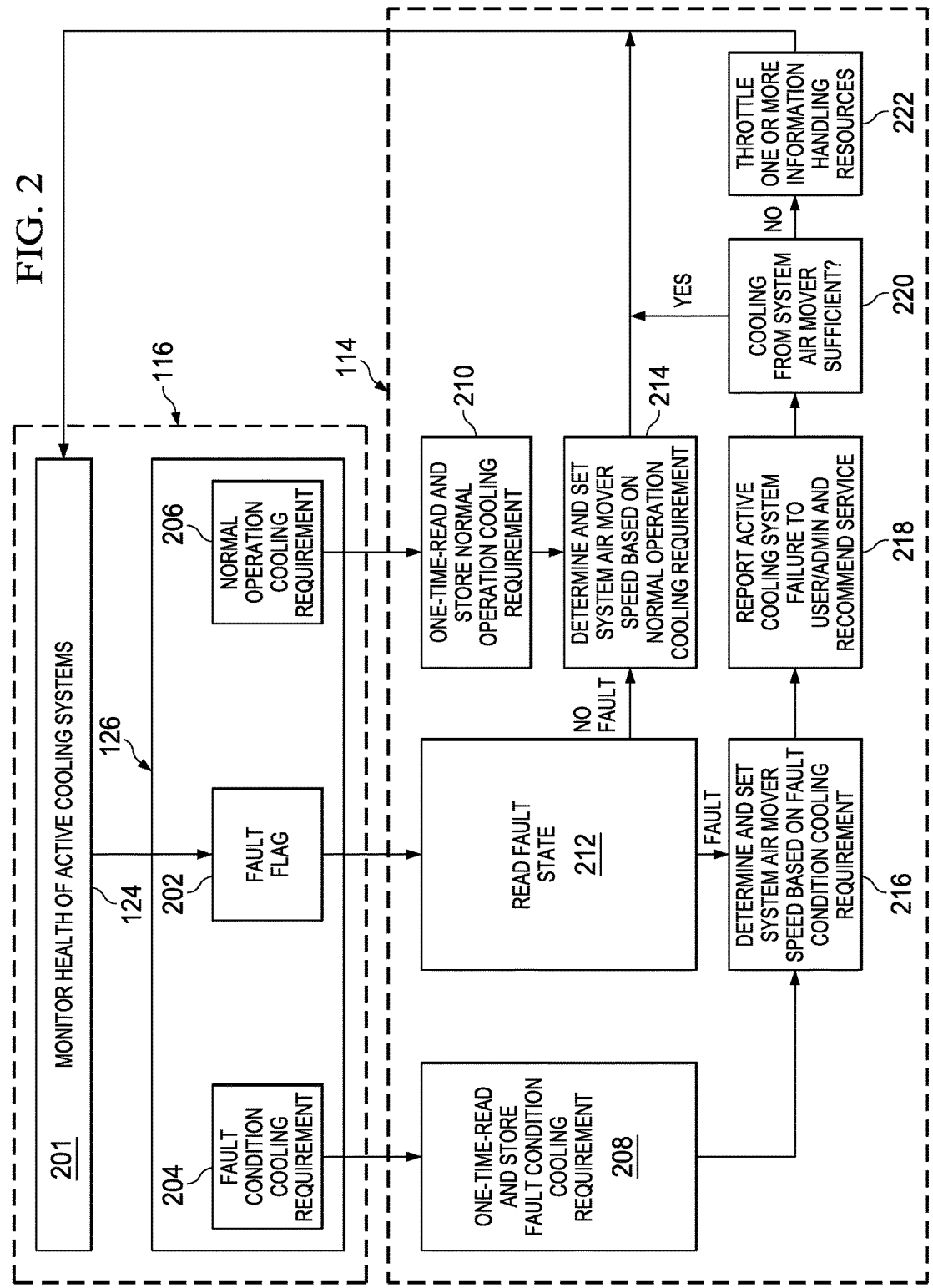
FIG. 2 illustrates a functional flow diagram of example operation of an example air mover control system and an information handling resource, in accordance with the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, buses, memories, I/O devices and/or interfaces, storage resources, network interfaces, motherboards, integrated circuit packages; electro-mechanical devices (e.g., air movers), displays, and power supplies.

FIG. 1 illustrates a block diagram of an example information handling system 102, in accordance with the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data. As shown in FIG. 1, information handling system 102 may comprise a processor 103, a memory 104, a system air mover 108, a management controller 112, and an information handling resource 116.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. System air mover 108 may include any mechanical or electro-mechanical system, apparatus, or device operable to move air and/or other gasses in order to cool information handling resources of information handling system 102. In some embodiments, system air mover 108 may comprise a fan (e.g., a rotating arrangement of vanes or blades which act on the air). In other embodiments, system air mover 108 may comprise a blower (e.g., centrifugal fan that employs rotating impellers to accelerate air received at its intake and change the direction of the airflow). In these and other embodiments, rotating and other moving components of system air mover 108 may be driven by a motor 110. The rotational speed of motor 110 may be controlled by an air mover control signal communicated from air mover control system 114 of management controller 112. In operation, system air mover 108 may cool information handling resources of information handling system 102 by drawing cool air into an enclosure housing the information handling resources from outside the chassis, expel warm air from inside the enclosure to the outside of such enclosure, and/or move air across one or more heat sinks (not explicitly shown) internal to the enclosure to cool one or more information handling resources.

Management controller 112 may comprise any system, device, or apparatus configured to facilitate management and/or control of information handling system 102 and/or one or more of its component information handling resources. Management controller 112 may be configured to issue commands and/or other signals to manage and/or control information handling system 102 and/or its information handling resources. Management controller 112 may comprise a microprocessor, microcontroller, DSP, ASIC, field programmable gate array ("FPGA"), EEPROM, or any combination thereof. Management controller 112 also may be configured to provide out-of-band management facilities for management of information handling system 102. Such management may be made by management controller 112 even if information handling system 102 is powered off or powered to a standby state. In certain embodiments, management controller 112 may include or may be an integral part of a baseboard management controller (BMC), a remote access controller (e.g., a Dell Remote Access Controller or Integrated Dell Remote Access Controller), or an enclosure controller. In other embodiments, management controller 112 may include or may be an integral part of a chassis management controller (CMC).

As shown in FIG. 1, management controller 112 may include an air mover control system 114. Air mover control system 114 may include any system, device, or apparatus configured to receive one or more signals indicative of one or more temperatures within information handling system 102 (e.g., one or more signals from one or more temperature sensors), and based on such signals, calculate an air mover driving signal to maintain an appropriate level of cooling, increase cooling, or decrease cooling, as appropriate, and communicate such air mover driving signal to system air mover 108. In these and other embodiments, air mover control system 114 may be configured to receive information from other information handling resources and calculate the air mover driving signal based on such received information in addition to temperature information. For example, as described in greater detail below, air mover control system 114 may receive configuration data 126 from information handling resource 116, which may include thermal requirements information and/or a health status (e.g., existence of a fault condition) of a local cooling system of the information handling resource 116. In addition to temperature information collected from sensors within information handling system 102, air mover control system 114 may also calculate the air mover driving signal based on such information received from information handling resource 116.

Information handling resource 116 may comprise any component system, device or apparatus of information handling system 102, including without limitation processors, buses, memories, I/O devices and/or interfaces, storage resources, network interfaces, motherboards, integrated circuit packages; electro-mechanical devices, displays, and power supplies. For example, in particular embodiments, information handling resource 116 may comprise a Peripheral Component Interconnect Express (PCIe) device.

Oftentimes, an architecture of information handling system 102 may be such that information handling resource 116 may be significantly downstream of system air mover 108 that it may be significantly more effective for information handling resource 116 to include an on-board local air mover 118 configured to drive air over heat sinks or other heat-rejection media thermally coupled to individual components (e.g., processors, controllers, or other integrated circuits) of information handling resource 116. Local air mover 118 may include any mechanical or electro-mechanical system, apparatus, or device operable to move air and/or other gasses in order to cool components of information handling resource 116. In some embodiments, local air mover 118 may comprise a fan. In these and other embodiments, rotating and other moving components of local air mover 118 may be driven by a motor 120. The rotational speed of motor 120 may be controlled by an air mover control signal communicated from an air mover control system 124 local to information handling resource 116.

Air mover control system 124 may include any system, device, or apparatus configured to receive one or more signals indicative of one or more temperatures associated with one or more components of information handling resource 116 (e.g., one or more signals from one or more temperature sensors), and based on such signals, calculate an air mover driving signal to maintain an appropriate level of cooling, increase cooling, or decrease cooling, as appropriate, and communicate such air mover driving signal to local air mover 118. In these and other embodiments, air mover control system 124 may also be able to detect the existence of a fault condition of local air mover 118 and report the existence of such fault condition (e.g., by storing an appropriate flag in configuration data 126). For example, a fault condition may be indicated by a temperature sensor internal to information handling resource reporting a temperature unlikely to exist in the absence of a fault condition, a motion sensor (e.g., tachometer) indicating that motor 120 of air mover 118 is moving at an insufficient speed to provide adequate cooling, and/or any other measurements or operational parameters indicating a fault condition.

Configuration data 126 may include thermal requirements information and/or a health status (e.g., existence of a fault condition) of a local air mover 118. Such thermal requirements information may comprise data including a minimum airflow required by information handling resource 116 from system air mover 108 in the absence of a fault condition of local air mover 118 and a minimum airflow required by information handling resource 116 from system air mover 108 in the presence of a fault condition of local air mover 118. In some embodiments, configuration data 126 may be stored in a computer-readable medium integral to information handling resource 116 (e.g., in a field replaceable unit).

In addition to processor 103, memory 104, air mover 108, management controller 112, and information handling resource 116, information handling system 102 may include one or more other information handling resources. In addition, for the sake of clarity and exposition of the present disclosure, FIG. 1 depicts only one system air mover 108 and one information handling resource 116. In embodiments of the present disclosure, information handling system 102 may include any number of system air movers 108 and information handling resources 116.

FIG. 2 illustrates a functional flow diagram of example operation of air mover control system 114 and information handling resource 116, in accordance with the present disclosure.

As shown at block 201, air mover control system 124 of information handling resource 116 may monitor health of the active cooling system of information handling resource 116, including the health of local air mover 118, and set a variable (e.g., the fault flag shown at block 202) indicative of whether a fault condition exists with respect to the active cooling system. As described above, configuration data 126 may include a minimum airflow required by information handling resource 116 from system air mover 108 in the presence of a fault condition in the active cooling system (e.g., as shown by the fault condition cooling requirement at block 204) and a minimum airflow required by information handling resource 116 from system air mover 108 in the absence of a fault condition in the active cooling system (e.g., as shown by the normal operation condition cooling requirement at block 206).

As shown at block 208, air mover control system 114 may read the fault condition cooling requirement from information handling resource 116 and store such information (e.g., in a computer-readable medium integral to or otherwise accessible to air mover control system 114). Similarly, as shown at block 210, air mover control system 114 may read the normal operation condition cooling requirement from information handling resource 116 and store such information (e.g., in a computer-readable medium integral to or otherwise accessible to air mover control system 114).

As shown at block 212, air mover control system 114 may read the fault state of the active cooling system of information handling resource 116 as indicated by the fault flag set by air mover control system 124. If no fault condition exists, air mover control system 114 may, at block 214, determine and set a speed for system air mover 108 based on the normal operation cooling requirement, and the process described above with respect to blocks 201, 202, and 212 may repeat. On the other hand, if a fault condition exists, air mover control system 114 may undertake one or more remedial actions.

Among the one or more remedial actions, air mover control system 114 may determine and set a speed for system air mover 108 based on the fault condition cooling requirement, as shown at block 216. In addition or alternatively, air mover control system 114 may, in response to a fault condition, report an active cooling system failure to a user or administrator of information handling system 102 and/or recommend service to correct the fault condition, as shown at block 218.

Furthermore, while operating system air mover 108 at a speed based on the fault condition cooling requirement, air mover control system 114 may determine whether cooling of information handling resource 116 in the fault condition by system air mover 108 is sufficient to maintain information handling resource 116 at or below a maximum threshold temperature, as shown at block 220. If cooling in the fault condition is sufficient, no further action may be taken and the process described above with respect to blocks 201, 202, and 212 may repeat. On the other hand, if cooling in the fault condition is insufficient, air mover control system 114 and/or another component of management controller 112 may cause one or more information handling resources of information handling system 102, including without limitation processor 103 and/or information handling resource 116, to throttle performance in order to reduce the heat generated by such one or more information handling resources, as shown in block 222.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a processor; and
   an air mover control system for controlling at least one system-level air mover configured to drive airflow to components of the information handling system, the air mover control system configured to:
   read from an information handling resource of the information handling system, wherein the information handling resource comprises a local active cooling system that is local to the information handling resource, is separate from the at least one system-level air mover, and includes a local air mover different from the at least one system-level air mover, a fault-condition cooling requirement defining a minimum airflow required by the information handling resource from the at least one system-level air mover in presence of a fault condition of the local active cooling system, wherein the fault condition of the local active cooling system includes a failure of the local air mover;
   read from the information handling resource a variable indicating whether the fault condition of the local active cooling system exists;
   responsive to the variable indicating the fault condition exists, determine a speed for the at least one system-level air mover to satisfy the fault-condition cooling requirement and cause the at least one air mover to operate at the speed;
   determine whether an airflow delivered by the at least one system-level air mover in accordance with the fault-condition cooling requirement is sufficient to maintain a temperature associated with the information handling resource below a threshold temperature; and
   responsive to determining that the airflow delivered by the at least one system-level air mover in accordance with the fault-condition cooling requirement is insufficient to maintain the temperature associated with the information handling resource below the threshold temperature, cause one or more components of the information handling system to throttle performance.

2. The information handling system of claim 1, the air mover control system further configured to:
   read from an information handling resource of the information handling system a normal-operation cooling requirement defining a minimum airflow required by the information handling resource from the at least one system-level air mover in absence of the fault condition of the local active cooling system; and
   responsive to the variable indicating the fault condition is absent, determine a speed for the at least one system-level air mover to satisfy the normal-operation cooling requirement and cause the at least one system-level air mover to operate at the speed.

3. The information handling system of claim 1, wherein the air mover control system is integral to a management controller communicatively coupled to the processor.

4. The information handling system of claim 1, wherein the air mover control system is configured to cause the processor to throttle performance responsive to determining that the airflow delivered by the at least one system-level air mover in accordance with the fault-condition cooling requirement is insufficient to maintain the temperature associated with the information handling resource below the threshold temperature.

5. The information handling system of claim 1, wherein the air mover control system is configured to cause the information handling resource to throttle performance responsive to determining that the airflow delivered by the at least one system-level air mover in accordance with the fault-condition cooling requirement is insufficient to maintain the temperature associated with the information handling resource below the threshold temperature.

6. A method comprising:
receiving a fault-condition cooling requirement defining a minimum airflow required by an information handling resource, in presence of a fault condition of a local active cooling system that is local to and integral to the information handling resource, the airflow being from at least one system-level air mover configured to drive airflow to components of an information handling system housing the information handling resource, wherein the at least one system-level air mover is separate from the local active cooling system, and wherein the fault condition of the local active cooling system includes a failure of a local air mover of the local active cooling system;
receiving a variable indicating whether the fault condition of the local active cooling system exists;
responsive to the variable indicating the fault condition exists, determining a speed for the at least one system-level air mover to satisfy the fault-condition cooling requirement and cause the at least one system-level air mover to operate at the speed;
determining whether an airflow delivered by the at least one system-level air mover in accordance with the fault-condition cooling requirement is sufficient to maintain a temperature associated with the information handling resource below a threshold temperature; and
responsive to determining that the airflow delivered by the at least one system-level air mover in accordance with the fault-condition cooling requirement is insufficient to maintain the temperature associated with the information handling resource below the threshold temperature, causing one or more components of the information handling system to throttle performance.

7. The method of claim 6, further comprising:
receiving a normal-operation cooling requirement defining a minimum airflow required by the information handling resource from the at least one system-level air mover in absence of the fault condition of the local active cooling system; and
responsive to the variable indicating the fault condition is absent, determining a speed for the at least one system-level air mover to satisfy the normal-operation cooling requirement and cause the at least one system-level air mover to operate at the speed.

8. The method of claim 6, further comprising causing a processor of the information handling system to throttle performance responsive to determining that the airflow delivered by the at least one system-level air mover in accordance with the fault condition cooling requirement is insufficient to maintain the temperature associated with the information handling resource below the threshold temperature.

9. The method of 6, further comprising causing the information handling resource to throttle performance responsive to determining that the airflow delivered by the at least one system-level air mover in accordance with the fault-condition cooling requirement is insufficient to maintain the temperature associated with the information handling resource below the threshold temperature.

10. An article of manufacture comprising:
a non-transitory computer-readable medium; and
computer-executable instructions carried on the computer-readable medium, the instructions readable by a processor, the instructions, when read and executed, for causing the processor to:
receive a fault-condition cooling requirement defining a minimum airflow required by an information handling resource, in presence of a fault condition of a local active cooling system that is local to and integral to the information handling resource, the airflow being from at least one system-level air mover configured to drive airflow to components of an information handling system housing the information handling resource, wherein the at least one system-level air mover is separate from the local active cooling system, and wherein the fault condition of the local active cooling system includes a failure of a local air mover of the local active cooling system;
receive a variable indicating whether the fault condition of the local active cooling system exists;
responsive to the variable indicating the fault condition exists, determine a speed for the at least one system-level air mover to satisfy the fault-condition cooling requirement and cause the at least one system-level air mover to operate at the speed,
determine whether an airflow delivered by the at least one system-level air mover in accordance with the fault-condition cooling requirement is sufficient to maintain a temperature associated with the information handling resource below a threshold temperature; and
responsive to determining that the airflow delivered by the at least one system-level air mover in accordance with the fault-condition cooling requirement is insufficient to maintain the temperature associated with the information handling resource below the threshold temperature, cause one or more components of the information handling system to throttle performance.

11. The article of claim 10, the instructions for further causing the processor to:
receive a normal-operation cooling requirement defining a minimum airflow required by the information handling resource from the at least one system-level air mover in absence of the fault condition of the local active cooling system; and
responsive to the variable indicating the fault condition is absent, determine a speed for the at least one system-level air mover to satisfy the normal-operation cooling requirement and cause the at least one system-level air mover to operate at the speed.

12. The article of claim 10, the instructions for further causing the processor to throttle performance responsive to determining that the airflow delivered by the at least one system-level air mover in accordance with the fault-condition cooling requirement is insufficient to maintain the temperature associated with the information handling resource below the threshold temperature.

13. The article of claim 10, the instructions for further causing the processor to cause the information handling resource to throttle performance responsive to determining that the airflow delivered by the at least one system-level air mover in accordance with the fault-condition cooling requirement is insufficient to maintain the temperature associated with the information handling resource below the threshold temperature.

* * * * *